(12) United States Patent
Finkenzeller et al.

(10) Patent No.: US 8,981,900 B2
(45) Date of Patent: Mar. 17, 2015

(54) METHOD, PORTABLE DATA CARRIER, AND SYSTEM FOR RELEASING A TRANSACTION USING AN ACCELERATION SENSOR TO SENSE MECHANICAL OSCILLATIONS

(75) Inventors: Klaus Finkenzeller, Unterfohring (DE); Wolfgang Rankl, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 416 days.

(21) Appl. No.: 13/380,173

(22) PCT Filed: Jun. 24, 2010

(86) PCT No.: PCT/EP2010/058965
§ 371 (c)(1),
(2), (4) Date: Mar. 9, 2012

(87) PCT Pub. No.: WO2010/149730
PCT Pub. Date: Dec. 29, 2010

(65) Prior Publication Data
US 2012/0161923 A1   Jun. 28, 2012

(30) Foreign Application Priority Data

Jun. 25, 2009   (DE) .......................... 10 2009 030 456

(51) Int. Cl.
*G08B 21/00* (2006.01)
*G06K 19/073* (2006.01)
*G06K 19/07* (2006.01)

(52) U.S. Cl.
CPC ...... *G06K 19/07345* (2013.01); *G06K 19/0716* (2013.01)

USPC .......... 340/5.81; 340/5.1; 340/5.4; 340/5.82; 235/380; 235/382; 726/22

(58) Field of Classification Search
CPC ................................. G06K 19/07345
USPC .............. 235/380, 382; 726/22; 340/5.1, 5.4, 340/5.51, 5.8, 5.81, 5.82
See application file for complete search history.

(56) References Cited

U.S. PATENT DOCUMENTS

| | | | |
|---|---|---|---|
| 2006/0244595 A1* | 11/2006 | Malone et al. ............. | 340/572.1 |
| 2007/0137462 A1* | 6/2007 | Barros et al. .................... | 84/453 |
| 2007/0176898 A1* | 8/2007 | Suh .............................. | 345/158 |
| 2008/0211622 A1 | 9/2008 | Rindtorff et al. | |
| 2009/0065575 A1 | 3/2009 | Phillips et al. | |
| 2010/0207730 A1 | 8/2010 | Boursier et al. | |

FOREIGN PATENT DOCUMENTS

| | | |
|---|---|---|
| EP | 2031548 | 3/2009 |
| WO | 2005106783 | 11/2005 |
| WO | 2008092527 | 8/2008 |

OTHER PUBLICATIONS

International Search Report in PCT/EP2010/058965, Sep. 23, 201.
(Continued)

*Primary Examiner* — George Bugg
*Assistant Examiner* — Mark Rushing
(74) *Attorney, Agent, or Firm* — Workman Nydegger

(57) ABSTRACT

A method, a portable data storage medium, an approval apparatus and a system for approving a transaction using acceleration sensors integrated in a portable data storage medium.

15 Claims, 5 Drawing Sheets

(56) References Cited

OTHER PUBLICATIONS

Alexei Czeskis et al., RFIDs and Secret Handshakes: Defending Against Ghost-and-Leech Attacks and Unauthorized Reads with Context-Aware Communications, 15th ACM Conference of Computer and Security 2008, XP002597239, pp. 479-490.
International Search Report in PCT/EP2010/058965, Sep. 23, 2010.

* cited by examiner

METHOD, PORTABLE DATA CARRIER, AND SYSTEM FOR RELEASING A TRANSACTION USING AN ACCELERATION SENSOR TO SENSE MECHANICAL OSCILLATIONS

BACKGROUND OF THE INVENTION

1. Field of the Invention

This invention relates to a method, a portable data carrier, a release apparatus and a system for releasing a transaction using acceleration sensors.

2. Related Art

According to this application an acceleration sensor will be understood to be a sensor that ascertains the acceleration of a body, for example by determining the inertial force acting on a test mass. There are known according to the prior art semiconductor-based acceleration sensors and rotation sensors. Such an acceleration sensor measures linear self-motions and accelerations and subsequently, on the basis of the measurement result, triggers switching operations in dependence on the self-motion in space. A rotation sensor ascertains the rotational self-motion around an axis. Merely by way of example, the single-axis rotation sensor LY530AL and the three-axis rotation sensor LIS344ALH from the company ST Microelectronics are stated as electronic components here.

The possibility of integrating a motion sensor into a portable data carrier, in particular in the form of a chip card, is known from the laid-open application DE 102 48 389. The motion sensor is used here exclusively for capturing lettering.

A problem of portable data carriers consists in the fact that they can be read out via a contactless interface from a distance, for example through a pocket, unnoticed by the owner. Especially critical in this connection is the possibility of a relay attack, because here a connection is set up via a radio link to an "authentic" reading device. Such an attack is described for example in Chapter 8 of the book "Handbuch für Chipkarten" by Rankl, Effing or in Chapter 8 of the book "RFID-Handbuch" by Finkenzeller. The relay attack is also referred to in the literature as a ghost-and-leech attack.

According to the prior art it is proposed to avoid this problem by for example equipping portable data carriers with a push-button. The installation of a push-button in a chip card or security token is very elaborate, however, and causes high production costs. Being a mechanical component, a push-button is furthermore always subject to wear and can also cause difficulties due to contact problems.

From the publication "*RFIDs and Secret Handshakes: Defending Against Ghost-and-Leech Attacks and Unauthorized Reads with Context-Aware Communications*", published at the 15th ACM Conference of Computer and Communications Security 2008, pages 479 to 490, there is known the possibility of capturing characteristic gestures using an acceleration sensor in order to release the access to a data carrier.

This use of gestures seems impracticable from today's point of view. With passive portable data carriers which are equipped without a battery, the range for making gestures is of a similar size to the range in which communication can be effected at all between the portable data carrier and an end device, in particular a reading device, because power is available to the data carrier for performing its measurements and calculations only in this range. Upon the use of reading devices according to ISO/IEC 14443 with a typical range of for example 10 cm, the latitude for motion for making a gesture within the reading range of a card is thus greatly limited. In addition, there is a possible psychological barrier to making complex gestures with the portable data carrier on an end device, for example a POS terminal or a transport ticket machine in public.

From the patent print EP 1 745 420 B1 it is known, on the other hand, to design the card body of a chip card with an inhomogeneous material. The characteristic self-oscillations arising from the material of the card upon excitation of the chip card are evaluated and the chip card thereby identified. This method appears very cost-intensive, because each card body must be individual.

The object of the present invention is therefore to show a method, a system, a portable data carrier and a release apparatus with which the release of a transaction between a portable data carrier and an end device is effected more cost-efficiently, more securely more easily.

A transaction will be understood according to this application to be a logical sequence of operations. A transaction is for example a payment operation between a portable data carrier and an end device via a contactless interface. A transaction is alternatively also the readout of security-critical information, for example PIN numbers, personal data or general secrets, such as TAN numbers, passwords and so forth.

SUMMARY OF THE DISCLOSURE

According to the invention, the object is achieved by a method for releasing a transaction between a portable data carrier and an end device by the portable data carrier first being brought into an electromagnetic field. The EM field is generated here by the end device. The EM field serves as a power supply and for activating the portable data carrier. At first, no transactions are released between the portable data carrier and the end device that include security-relevant information or data. Subsequently, the portable data carrier is excited by mechanical oscillation. These mechanical oscillations are subsequently captured in the portable data carrier by means of acceleration sensor. Subsequently, the output signal of the acceleration sensor is evaluated or analyzed with regard to characteristic properties of the mechanical oscillation. As soon as a characteristic property of the oscillation has been recognized through the evaluation of the output signal, there is effected the releasing of the transaction by the portable data carrier.

A portable data carrier according to this application is, in principle, not of any predetermined form or configuration. In particular, a portable data carrier is understood to be a chip card, smart card, or in general a security token for example with an identification function. Alternative configurations, for example as a mass memory card, for example μSD card, are likewise conceivable. Further, it is understood according to this application to be an electronic passport or different kind of identification medium which contains security-critical information that should not generally be read out of the data carrier. In the broader sense, the portable data carrier is a mobile phone with which transactions can be carried out with an end device, for example via a near-field communication. The mobile phone as a portable data carrier here has a near-field communication interface.

An end device is understood to be any type of communication device with which the portable data carrier can communicate in particular contactlessly. A communication is effected by way of example with a reading device, also designated a terminal, standardized according to ISO/IEC 14443. The end device is for example a POS terminal or a transport ticket machine with a near-range communication interface.

An oscillation fundamentally describes the periodic course of a change of state of a physical quantity. A kind of mechanical oscillation is understood to be for example a vibration, an abrupt placement or the rubbing/bending of the data carrier.

Through the method of the invention, a portable data carrier is prevented in simple fashion from carrying out a transaction with an end device without the transaction having been previously released. In this manner there are prevented for example relay attacks or transactions not desired by the user of the portable data carrier.

In an advantageous embodiment, the portable data carrier is set into self-oscillation by the mechanical excitation. Subsequently, this self-oscillation of the data carrier is captured in the form of acceleration by the acceleration sensor and evaluated. The advantage in this embodiment is to be seen in that an acceleration of the data carrier is readily evaluable with minimum excitation.

Advantageously, the characteristic property is the time duration, the frequency and/or the amplitude of the mechanical oscillation. Therefore, a transaction is only released when a target value of the characteristic property of the oscillation is exceeded, otherwise the transaction is not released.

In an advantageous embodiment, the excitation of the data carrier is effected with mechanical oscillation by the end device. For this purpose, the data carrier is placed on the end device. Parts of the surface of the end device are set oscillating in particular by a mechanism. Alternative methods for exciting the surface to oscillate are likewise conceivable. The portable data carrier is excited by this mechanical oscillation. The accelerometer in the data carrier captures these mechanical oscillations by the data carrier itself being accelerated in at least one direction. As mechanical oscillations there are advantageously provided vibrations with deflections in the millimeter or sub-millimeter range. The user of the portable data carrier is actively involved in the transaction releasing method through placement on the end device.

A simple and thereby advantageous embodiment is given when the end device is equipped with an oscillatable partial surface. This partial surface becomes oscillating by means of linear or circular motions, for example of a mechanism in the end device, and excites the placed-on portable data carrier. Preferably, the end-device antenna which is provided for emitting the electromagnetic field is incorporated in or under the oscillatable partial surface of the end device. Thus, the already small range for communication between end device and data carrier is not additionally reduced by the method of the invention.

In a preferred embodiment, the linear or circular oscillations of the end device are fluctuating in frequency. Alternatively or additionally, several linear or circular mechanical oscillations are superimposed. The fluctuation of the frequencies and/or the oscillation superimposition are evaluated as the characteristic property in the portable data carrier. It is thus possible to realize different types of release for communication between data carrier and end device. A corresponding coding is likewise possible.

By the emission of further linear or circular oscillations by the end device during the transaction it is possible to convey different status messages or status information of the transaction, for example the end or the failure of a transaction.

In an alternative embodiment of the invention, the exciting of the data carrier with mechanical oscillation is effected such that the data carrier is abruptly deposited on the end device. The abrupt placement is evaluated as the characteristic property of the mechanical oscillations. In particular, the self-acceleration of the portable data carrier before the abrupt placement and/or an angle acquisition after the abrupt placement are evaluated as the characteristic property of the mechanical oscillations here.

In a further alternative embodiment, the portable data carrier is excited mechanically by being moved or rubbed on an outer surface of the end device. The oscillations arising from the friction are captured as accelerations in the portable data carrier and evaluated.

The bringing of the portable data carrier into an EM field for supplying power can be omitted insofar as the data carrier has its own power supply, for example in the form of an accumulator, a battery and/or a photovoltaic cell. In this embodiment the EM field is unnecessary for supplying power; the release of a transaction will nevertheless proceed by the method of the invention in order to prevent for example the readout of security-relevant or security-critical information of the above-described type.

Likewise provided according to the invention is a portable data carrier for data transfer with an end device, whereby the data carrier has a release apparatus and the release apparatus comprises an acceleration sensor, wherein mechanical oscillations of the data carrier are ascertainable by the acceleration sensor, and an evaluation unit, wherein the evaluation unit is provided for evaluating the acceleration sensor output signals and ascertains the mechanical oscillations. A data transfer between portable data carrier and end device is releasable as soon as the evaluation unit generates a release signal by reason of a mechanical-oscillation characteristic required for the release.

Further, there is contained in the scope of the invention a module for releasing a transaction with an end device. The module comprises an acceleration sensor for capturing a mechanical oscillation, an evaluation unit for evaluating the captured mechanical oscillation, whereby the mechanical oscillation is evaluated with regard to characteristic properties, a comparing unit for comparing the characteristic properties of the mechanical oscillation of the evaluation unit with a target value of the characteristic properties, whereby the comparing unit releases the transaction when the target value of the characteristic property is exceeded, and the comparing unit does not release the transaction when the target value of the characteristic property is undershot.

The target value could be stored in a data storage in the data carrier and be retrieved during the evaluation of the characteristic property of the oscillation.

Finally, there is provided according to the invention a system for releasing a transaction. The system comprises a portable data carrier, including an above-described module for releasing a transaction with an end device, and the end device itself, whereby the portable data carrier is excitable with a mechanical oscillation, and the comparing unit of the module releases the transaction upon exceeding of a target value of a characteristic property of the mechanical oscillation.

An advantage of the method of the invention is the use of the card in the way that the user is accustomed to. For this purpose, there are employed semiconductor components which can be integrated simply into a hardware module, for example into a chip module of a chip card as the portable data carrier.

DESCRIPTION OF THE DRAWINGS

There are shown.

DETAILED DESCRIPTION OF PREFERRED EMBODIMENTS OF THE INVENTION

Figure 1:
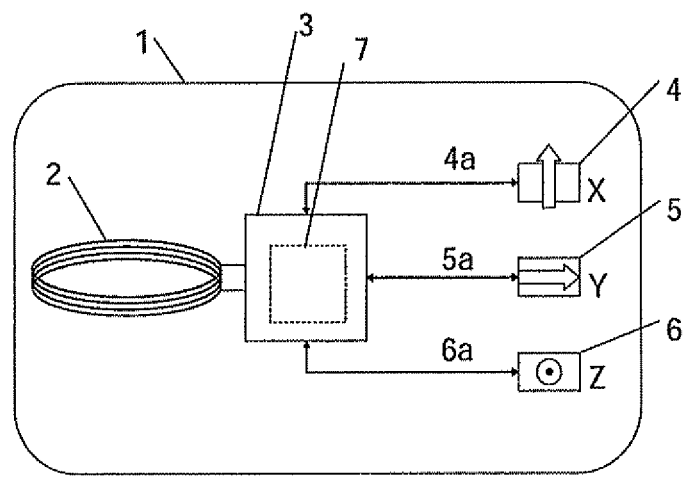
FIG. 1 a block diagram of a portable data carrier according to the invention with a release apparatus for releasing a transaction in a plan view FIG. 2 a block diagram of a portable data carrier according to the invention according to FIG. 1 as a cross-sectional drawing FIG. 3 a block diagram of a transaction releasing system according to the invention FIG. 4 a sketched representation of an oscillatable partial surface, according to the invention, of an end device with an oscillation generating apparatus FIG. 5 a detailed block diagram of a release apparatus according to the invention for incorporation into a portable data carrier according to FIG. 1 or 2

In FIG. 1 there is represented a block diagram of a portable data carrier 1 according to the invention with a release apparatus 7 for releasing a transaction in a plan view. The portable data carrier 1 is represented here in the form of a chip card or smart card. For communication with an end device (not represented here) there is incorporated into the body of the data carrier 1 an antenna 2 for near-field communication or NFC. The antenna 2 is electrically coupled with antenna terminals to an integrated circuit 3. By the EM field and the antenna 2 the integrated circuit 3 is supplied with power and activated. The integrated circuit 3 has the release apparatus 7. Further, the portable data carrier 3 has acceleration sensors 4, 5, 6 incorporated therein. The acceleration sensor 4 captures accelerations in the X direction, the sensor 5 accelerations in the Y direction, and the acceleration sensor 6 in the Z direction. The output signals 4a, 5a and 6a of the acceleration sensors 4, 5, 6 are supplied to the integrated circuit 3.

Figure 2:
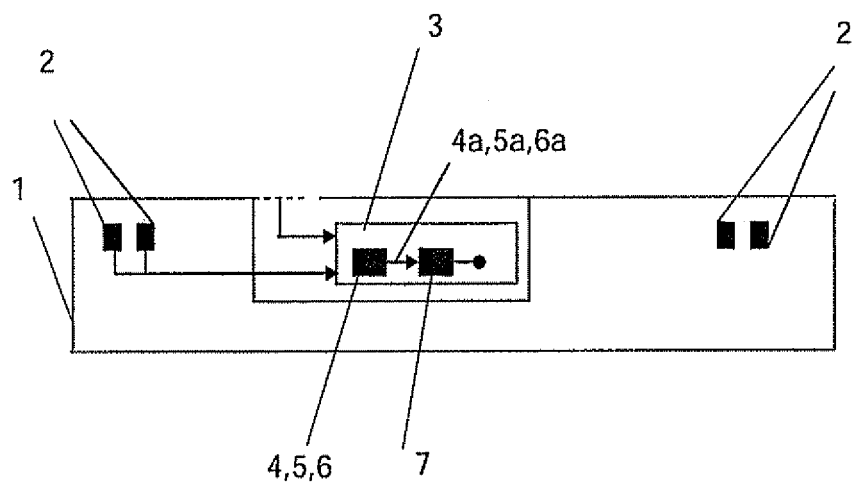

In FIG. 2 there is represented the portable data carrier 1 from FIG. 2 as a cross section in a block diagram.

When the portable data carrier 1 according to FIG. 1 or 2 is brought into an electromagnetic field, or EM field for short, generated by an end device, the antenna 2 draws power from the generated EM field and makes this power available to the integrated circuit 3. According to the invention it is provided to evaluate the output signals 4a, 5a, 6a of the acceleration sensors 4, 5, 6 with regard to a characteristic property upon the entry and sojourn of the data carrier 1 and to derive therefrom the decision to release or not release a contactless transaction. The integrated circuit 3 thus gives no release of a transaction with the end device until the acceleration sensors 4, 5, 6 capture accelerations in that form and supply them as output signals 4a, 5a, 6a to the integrated circuit 3, so that a characteristic property of mechanical oscillation has been ascertained.

As the characteristic property that for release of a transaction between end device and data carrier 1 there can be considered for example a time duration T, an amplitude height of the output signals 4a, 5a 6a, a sequence of an intensity fluctuation, or a special frequency of the captured accelerations. These characteristic properties can also be arbitrarily combined for a required release.

In FIGS. 1 and 2, the acceleration sensors 4, 5, 6 are incorporated into the body of the portable data carrier 3 separately from the circuit 3. Alternatively and preferably, the acceleration sensors 4, 5, 6 are incorporated in the integrated circuit 3. Alternatively, only one acceleration sensor or at least one rotation sensor (not represented in the figures) can be provided instead of the three acceleration sensors 4, 5, 6.

The data carrier 1 is constituted such that it carries out a sufficiently detectable acceleration in the interior of the data carrier body upon excitation by means of mechanical oscillation.

Figure 3:
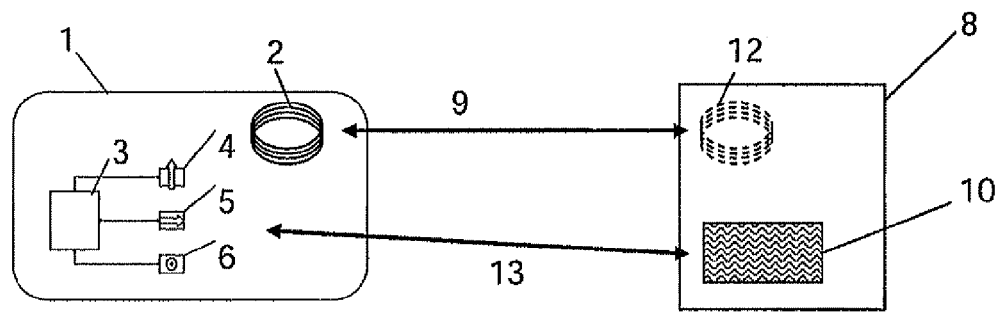

In FIG. 3 there is represented a system, according to the invention, for releasing a transaction between a portable data carrier 1 and an end device 8. The data carrier 1 corresponds here to the data carrier 1 described in FIGS. 1 and 2. The end device 8, or terminal, is not limited in its function, being for example a reading device. The end device 8 has an antenna 12. Thus, a near-field communication 9 takes place contactlessly by means of the antennas 2 and 12. Additionally, the end device 8 has an oscillatable partial surface 10. With this partial surface 10 mechanical oscillations 13 are performed. The mechanical oscillation 13a is excited here by the end device 8 itself. The antenna 12 of the reading device is preferably housed in or under the oscillatable partial surface, e.g. in a coaxial arrangement.

The mechanical oscillations exciting the portable data carrier 1 are generated by the end device 8 in FIG. 3 and can be for example linear or circular.

Figure 4:
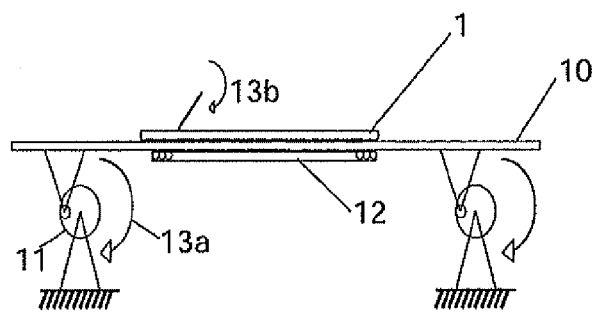

FIG. 4 shows an example for generating a circular oscillation of the partial surface 10. For this purpose, the partial surface 10 is suspended concentrically on a flywheel 11. A rotational motion 13a of the flywheel 11 leads to a circular motion of the partial surface 10. In practice the oscillations have an amplitude in the millimeter or sub-millimeter range. Oscillation frequencies can be in the range of a few hertz up to a few tens of hertz. Such mechanical oscillations are humanly perceived as vibration, similar to the vibration alarm of a mobile phone.

For carrying out a transaction, for example a payment transaction or readout of security-critical information, it is provided that the data carrier 1 of the invention is deposited on the surface 10 of an end device 8 according to the invention. For releasing the data exchange or communication with the data carrier 1 it is provided that a vibration is first generated at a certain time before the transaction. This vibration is transferred to the data carrier 1 and captured by the acceleration sensors 4, 5. The type of vibration, the amplitude and the frequency of the vibration can be easily captured here via the sensor output signals 4a, 5a, 6a.

Figure 6:
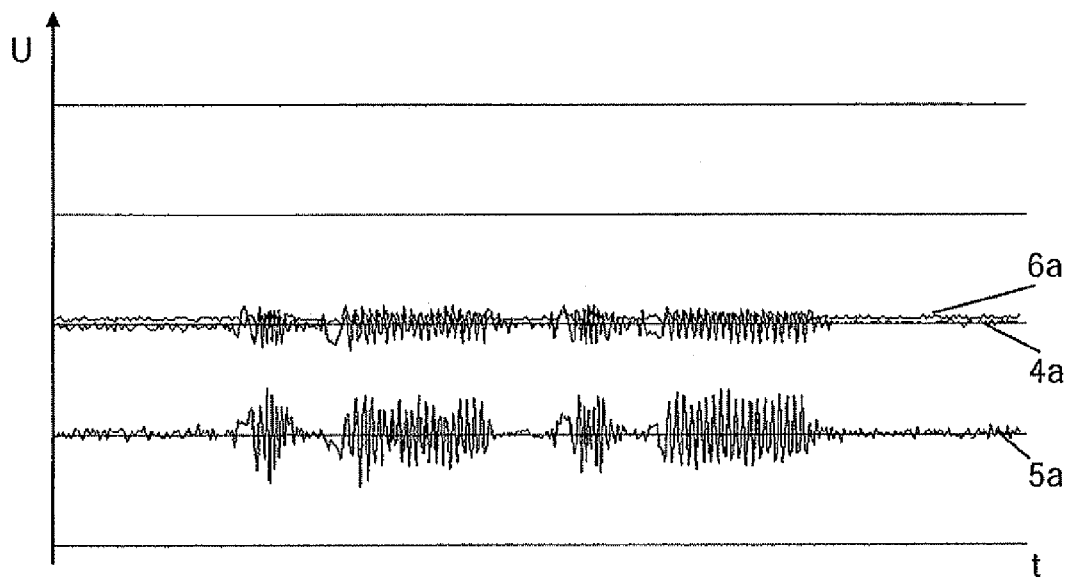
FIG. 6 an exemplary voltage-time curve of the acceleration sensor output signals in X, Y and Z directions upon exciting of the data carrier by means of mechanical oscillations generated by the end device FIG. 7 an exemplary voltage-time curve of the acceleration sensor output signals in X, Y and Z directions upon exciting of the data carrier by abrupt placement of the data carrier FIG. 8 exemplary acceleration sensor output signals in X, Y and Z directions upon placement of the data carrier on a 30° inclined surface FIG. 9 an exemplary amplitude-frequency curve of the acceleration sensor output signals in X, Y and Z directions by FFT analysis of the curve shown in FIG. 6
Figure 7:
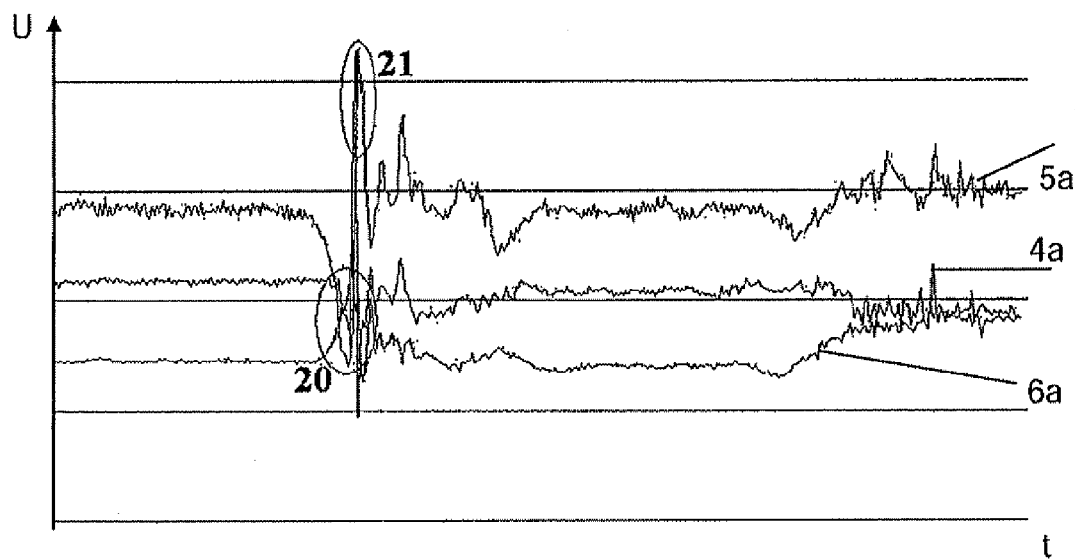

An example of the sensor measured values of a pulsed circular vibration is represented in FIG. 6. The three measured curves represent here the oscillation axes X, Y, Z, in accordance with the signals 4a, 5a, 6a of the acceleration sensors 4, 5, 6. According to the invention it is provided that the data carrier 1 analyzes and evaluates the oscillation patterns of the captured oscillations with regard to at least one characteristic property. If the measured values are within a tolerance range of an expected range, it is provided that the intended transaction with the data carrier 1 is released. Alternatively, it is also possible to release the access to a selected storage area of the data carrier 1 and/or the further communication between the end device 8 and the data carrier 1. The tolerance range can also be a target value threshold of one of the characteristic properties of the oscillation, which must be exceeded for release.

One possible option consists in the vibration signal also being output to the user of the data carrier 1 for signaling operating states. When the data carrier 1 is held with the hand on a corresponding end device 8, the vibrations are easy to feel. This is advantageous insofar as a "beep signal" is easily missed in a noisy environment, while a "flashing signal" cannot be recognized by blind people. Thus, the first vibration which leads to release of a transaction, etc., can be followed by a second vibration for signaling a successful transaction to the user. A kind of coding of the vibration can also signal to the user that a transaction was successful, for example an intensity fluctuation of the vibration (rrr - - - rrr) for a successful transaction, and long constant-intensity vibration (rrrrrrrrrrrrrr) upon the occurrence of an error. The evaluation, calculation and rating of the mechanical oscillations is carried out for example by software on the integrated circuit 3.

A further option consists in the data carrier 1 analyzing oscillation parameters determined by the end device 8, in particular the frequency. A further possibility also consists in superimposing several oscillation frequencies. Such a superimposed oscillation can be very easily generated for example with an electromagnetic oscillator system.

Figure 9:
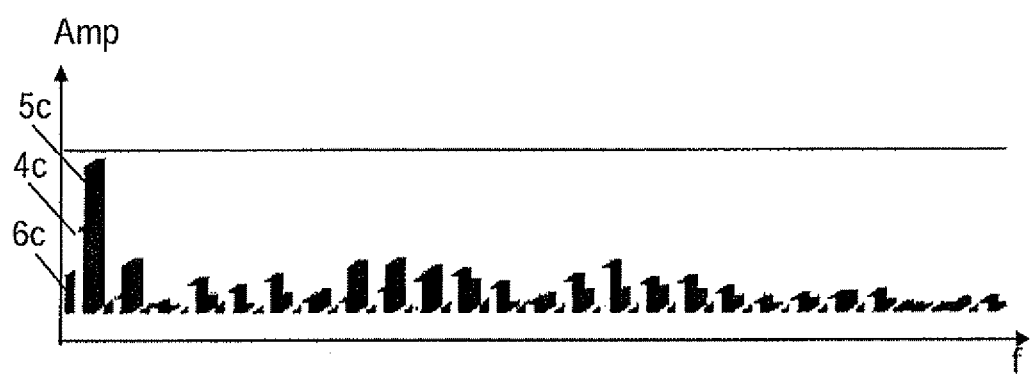

Using an FFT it is easy to check the occurrence of the different oscillation frequencies. In FIG. 9 this is represented by way of example by the calculated FFT signals 4c, 5c, 6c. Through the performed FFT the spectrum of the evaluated sensor output signals 4b, 5b, 6b shows the individual frequency components in the signals after an FFT analysis.

Figure 5:
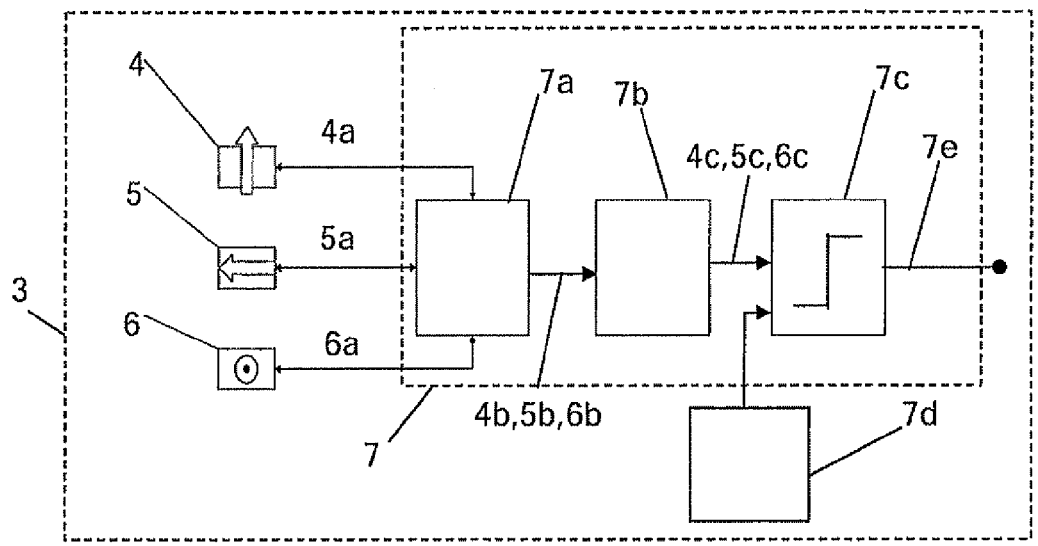

A detailed block diagram of a circuit 3 incorporated in the portable data carrier 1 as in the previous figures is represented in FIG. 5. The sensors 4, 5, 6 are likewise arranged within the integrated circuit 3 here. The output signals 4a, 5a, 6a of the sensors 4, 5, 6 are supplied to the evaluation unit 7a. An evaluation of the signals can be for example the amplitude height, the time duration, etc. In principle, these evaluated signals can be supplied directly to the comparing unit 7c in order to be compared there optionally with target value stored in a target value storage 7d in the data carrier 1. Upon exceeding of the target value the release of the transaction is effected through a release signal 7e. Alternatively, as represented in FIG. 6, the evaluated signals are first supplied to a calculation unit 7b. This calculation unit 7c calculates the signals 4c, 5c, 6c. As the calculation there is provided for example an FFT analysis or the calculation of the static angle of the data carrier from the evaluated signals 4b, 5b, 6b.

Figure 8:
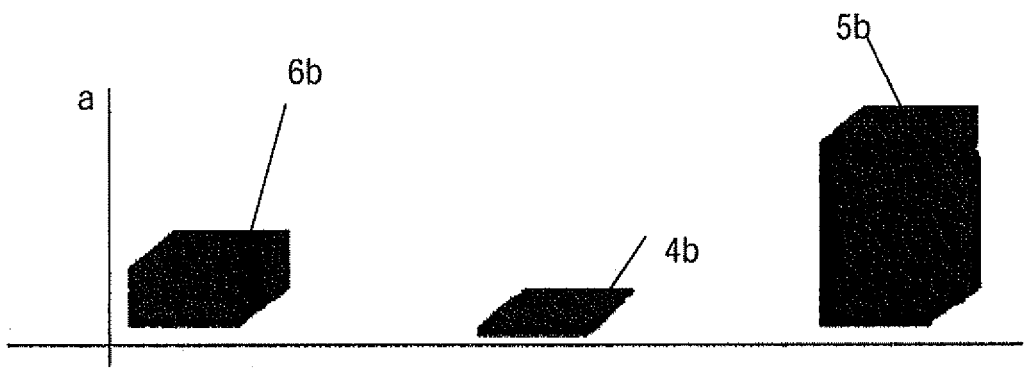

In a second embodiment of the invention it is provided that the data carrier 1 is not excited by mechanical oscillations generated by the end device. For example, the data carrier 1 can be excited by the data carrier 1 being placed abruptly on a surface, for example a surface in proximity of the antenna 12 of the end device 8, and remaining there during the transaction. The abrupt placing, striking or thudding of the data carrier 1 leads to high acceleration values 21, as represented in FIG. 8. The self-acceleration 20 of the data carrier 1 before the abrupt placement is also well recognizable in FIG. 8. By means of the calculation unit 7b it is possible for example to evaluate which static angle the data carrier 1 has at the moment. FIG. 8 shows the measured values of a data carrier 1 in the rest position on a 30° inclined surface.

According to the invention it is therefore provided that the data carrier 1, upon entry into the communication range of an end device 8, measures the acceleration and analyzes and evaluates the measured values. After the abrupt placement of the data carrier 1 on the surface of the reading device there is ascertained the static position, for example the angle, of the data carrier 1, which is normally resting flat on the surface of the end device 8. If the measured values are within a tolerance range of an expected range, it is provided that the intended transaction with the data carrier 1, the access to a selected storage area of the data carrier and/or the further communication between the end device 8 and the data carrier 1 is released.

One option consists in arranging the contact surface (antenna area) of the reading device at a defined angle, e.g. 30°, see FIG. 8. The data carrier 1 can check after being placed on the surface of the end device 8 whether this angle is adhered to within defined tolerance ranges.

An alternative excitation of the data carrier 1 is effected by a user rubbing the data carrier 1 to and fro on a surface of the end device 8. Thereby resulting mechanical oscillations or the self-acceleration of the data carrier 1 are captured by the acceleration sensors 4, 5, 6 and evaluated.

Figure 10:
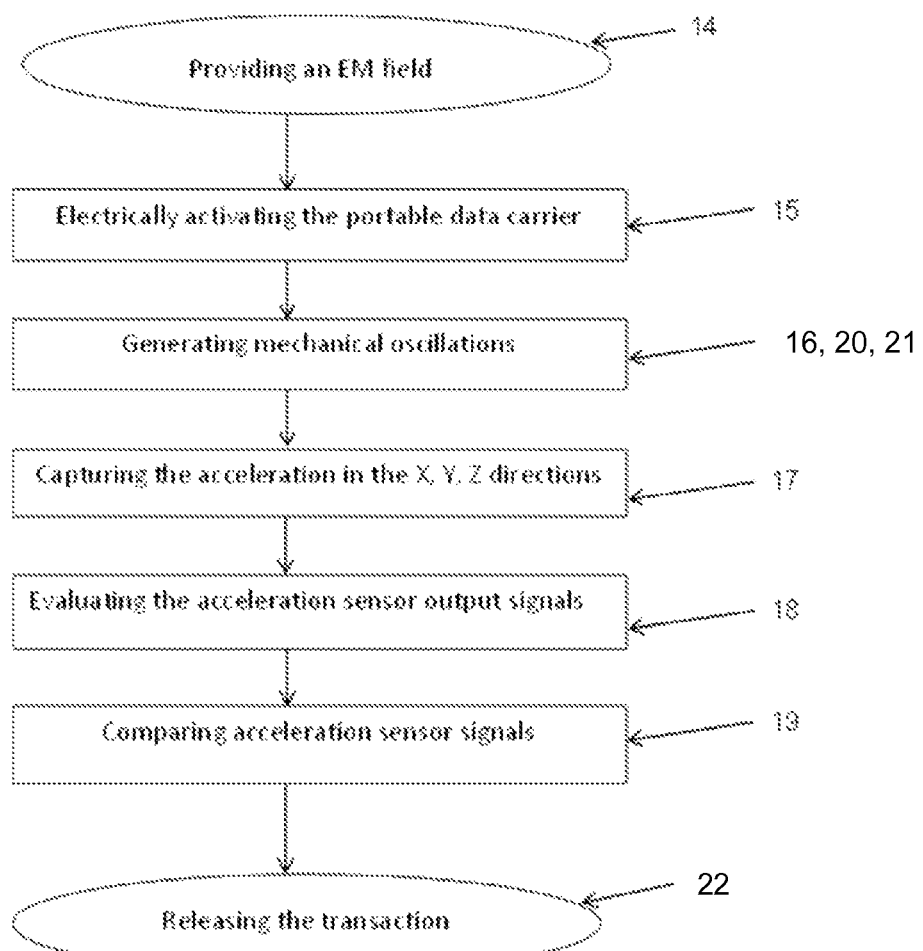
FIG. 10 a flowchart of a method according to the invention for releasing a transaction between a portable data carrier and an end device

In FIG. 10 there is represented an exemplary flowchart for a method, according to the invention, for releasing a transaction between end device 8 and portable data carrier 1. By provision 14 of an EM field by the end device 8 the portable data carrier 1 is electrically activated 15. By mechanical excitation 16 by means of mechanical oscillation, for example vibration, abrupt placement with resulting high acceleration values 20, 21, or rubbing together of the surfaces of data carrier 1 and end device 8, and subsequent capturing 17 of the acceleration in X, Y, Z directions by means of the sensors 4, 5, 6, it is possible to ascertain the accelerations by evaluation and/or calculation 18 of the acceleration sensor output signals 4a, 5a, 6a. In step 19 there is effected the comparison of the signal values with regard to characteristic properties, such as for example frequency, amplitude, time duration, static angle, frequency fluctuation, frequency superimposition, frequency components or the like. In method step 22 there is finally effected the release of the transaction upon exceeding of a target value or upon adherence to a defined tolerance range. Target values and tolerance range are preferably stored in a storage area of the data carrier 1.

The method of the invention is preferably implemented at least partly in the form of computer software in the integrated circuit 3. The integrated circuit 3 then performs the corresponding method steps as implemented program steps.

As a further, case of application of the invention there is provided the carrying out of a transaction with an NFC-capable mobile phone as the portable data carrier. A user wishing for example to carry out a payment transaction now need not confirm it with the keyboard of his mobile phone, but rather the release of the transaction is effected according to the described subjects of the invention. By excitation of the mobile phone as the portable data carrier by means of mechanical oscillation, the release of the transaction is effected as soon as characteristic properties of the oscillations have been captured and evaluated in the mobile phone. This patent application synonymously employs the terms mobile phone, PDA, communication device, organizer, electronic calendar and the like.

The decisive advantage of both embodiments consists in that the expected motion patterns of the data carrier 1 cannot be provided unnoticedly by an attacker having no mechanical access to the card, such as for example in a typical relay attack. The absolute position of the card cannot be changed unnoticedly by an attacker either.

The invention claimed is:

1. A method for releasing a transaction between a portable data carrier and an end device, the method comprising the steps:

a) bringing the portable data carrier into an electromagnetic field generated by the end device and drawing power by the data carrier from the electromagnetic field for the power supply of the data carrier, b) exciting the portable data carrier by mechanical oscillation generated by the end device, wherein the end device generates linear, circular, or a combination of linear and circular mechanical oscillations and mechanically excites the portable data carrier by the linear, circular, or the combination of linear and circular mechanical oscillations, c) capturing the mechanical oscillation in the portable data carrier by means of an acceleration sensor, d) evaluating an output signal of the acceleration sensor with regard to characteristic properties of the mechanical oscillation, and e) releasing the transaction by the portable data carrier as soon as a characteristic property of the oscillation has been recognized through the evaluation of the output signal.

2. The method according to claim 1, wherein the portable data carrier is set into self-oscillation by the mechanical excitation, and this self-oscillation is captured and evaluated.

3. The method according to claim 1, wherein as the characteristic property the time duration, the frequency or the amplitude of the mechanical oscillation is evaluated.

4. The method according to claim 1, wherein the end device excites the portable data carrier via an oscillatable partial surface of the end device.

5. The method according to claim 4, wherein the linear or circular mechanical oscillations of the end device fluctuate in frequency, and the frequency fluctuation is evaluated as the characteristic property in the portable data carrier.

6. The method according to claim 4, wherein several linear or circular mechanical oscillations of the end device are superimposed, and this oscillation superimposition is evaluated as the characteristic property in the portable data carrier.

7. The method according to claim 4, wherein further linear or circular oscillations are emitted during the transaction.

8. The method according to claim 4, wherein an antenna of the end device emits the electromagnetic field and the electromagnetic signal is incorporated in or under the oscillatable partial surface of the end device.

9. The method according to claim 4, wherein the end device vibrates.

10. The method according to claim 1, wherein the portable data carrier is excited mechanically by placing the portable data carrier abruptly on the end device, and the abrupt placement is evaluated as the characteristic property of the mechanical oscillations.

11. The method according to claim 10, wherein: the self-acceleration and/or high acceleration values before the abrupt placement and/or an angle acquisition after the abrupt placement are evaluated as the characteristic property of the mechanical oscillations.

12. The method according to claim 1, wherein the portable data carrier is excited mechanically by rubbing the portable data carrier on an outer surface of the end device.

13. A portable data carrier for transferring data with an end device, wherein the data carrier includes a release apparatus, said release apparatus comprising:

an acceleration sensor configured to ascertain mechanical oscillations generated by the end device and to generate acceleration sensor output signals, wherein the end device generates linear, circular, or a combination of linear and circular mechanical oscillations and mechanically excites the portable data carrier by the linear, circular, or the combination of linear and circular mechanical oscillations, and an evaluation unit that evaluates the acceleration sensor output signals and ascertains the mechanical oscillations, a data transfer between portable data carrier and end device being releasable upon the evaluation unit generating a release signal by reason of a mechanical-oscillation characteristic required for the release.

14. A module for releasing a transaction with an end device, comprising:

an acceleration sensor for capturing a mechanical oscillation generated by the end device, wherein the end device generates linear, circular, or a combination of linear and circular mechanical oscillations and mechanically excites the portable data carrier by the linear, circular, or the combination of linear and circular mechanical oscillations, an evaluation unit for evaluating the captured mechanical oscillation, wherein the mechanical oscillation is evaluated with regard to characteristic properties, a comparing unit for comparing the characteristic properties of the mechanical oscillation of the evaluation unit with a target value of the characteristic properties, wherein the comparing unit releases the transaction when the target value of the characteristic property is exceeded, and the comparing unit does not release the transaction when the target value of the characteristic property is undershot.

15. A system for releasing a transaction comprising:

a portable data carrier, including the module recited in claim 14, and an end device, wherein the portable data carrier is excitable with the mechanical oscillation generated by the end device, and the comparing unit of the module for releasing releases the transaction upon exceeding of a target value of a characteristic property of the mechanical oscillation.

* * * * *